US012523014B2

(12) United States Patent
Guarino et al.

(10) Patent No.: US 12,523,014 B2
(45) Date of Patent: Jan. 13, 2026

(54) SYSTEM AND METHOD FOR CONTROLLING HYDRAULIC FLUID FLOW WITHIN A WORK VEHICLE

(71) Applicant: CNH Industrial America LLC, New Holland, PA (US)

(72) Inventors: Joshua Matthew Guarino, Plainfield, IL (US); Ryan P. Jenkins, Oakbrook, IL (US); Xin Tian, Lisle, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/630,347

(22) Filed: Apr. 9, 2024

(65) Prior Publication Data

US 2025/0314046 A1 Oct. 9, 2025

(51) Int. Cl.
*E02F 9/22* (2006.01)
*F15B 11/05* (2006.01)
*F15B 11/16* (2006.01)

(52) U.S. Cl.
CPC .......... *E02F 9/2285* (2013.01); *E02F 9/2228* (2013.01); *F15B 11/05* (2013.01);
(Continued)

(58) Field of Classification Search
CPC ....... E02F 9/2228; E02F 9/2285; F15B 11/05; F15B 2211/30535; F15B 2211/40561; F15B 2211/50572
See application file for complete search history.

(56) References Cited

U.S. PATENT DOCUMENTS 3,987,622 A 10/1976 Johnson
4,617,854 A * 10/1986 Kropp .................. E02F 9/2232 91/531

(Continued)

FOREIGN PATENT DOCUMENTS

DE 202005015923 U1 12/2005
EP 1672225 A2 * 6/2006 ............. F15B 11/05

(Continued)

OTHER PUBLICATIONS

EP 1672225 A2 machine translation thereof (Year: 2006).*

(Continued)

*Primary Examiner* — Matthew Wiblin
(74) *Attorney, Agent, or Firm* — Dority & Manning, P.A.

(57) ABSTRACT

A system for controlling hydraulic fluid flow within a work vehicle includes a hydraulic load and a pump configured to supply hydraulic fluid to the hydraulic load via a fluid supply conduit. The system also includes a flow control valve fluidly coupled to the fluid supply conduit upstream of the hydraulic load, a pilot-operated compensator valve fluidly coupled to the fluid supply conduit upstream of the flow control valve, and a pilot conduit fluidly coupled to the pilot-operated compensator valve such that the pilot conduit is configured to supply a pilot flow of hydraulic fluid to the pilot-operated compensator valve. Additionally, the system include a pilot selector valve configured to selectively fluidly couple the pilot conduit to either a first pilot source conduit or a second pilot source conduit to adjust a source of the pilot flow supplied to the pilot-operated compensator valve.

22 Claims, 3 Drawing Sheets

(52) U.S. Cl.
CPC ........... *F15B 11/163* (2013.01); *F15B 11/166* (2013.01); *F15B 2211/30535* (2013.01); *F15B 2211/40561* (2013.01); *F15B 2211/50572* (2013.01)

(56) References Cited

U.S. PATENT DOCUMENTS

| | | | |
|---|---|---|---|
| 4,739,617 | A | 4/1988 | Kreth et al. |
| 4,796,661 | A | 1/1989 | Hishinuma et al. |
| 5,138,837 | A | 8/1992 | Obertrifter et al. |
| 5,237,908 | A * | 8/1993 | Kropp .................. F15B 11/163 91/518 |
| 5,279,122 | A | 1/1994 | Shirai et al. |
| 5,289,679 | A | 3/1994 | Yasuda |
| 5,347,811 | A | 9/1994 | Hasegawa et al. |
| 5,579,642 | A | 12/1996 | Wilke et al. |
| 5,791,142 | A | 8/1998 | Layne et al. |
| 5,907,951 | A | 6/1999 | Toyooka et al. |
| 6,173,572 | B1 | 1/2001 | Cobo et al. |
| 6,179,570 | B1 | 1/2001 | Smith |
| 6,318,079 | B1 | 11/2001 | Barber |
| 6,367,365 | B1 | 4/2002 | Weickert et al. |
| 6,422,009 | B1 | 7/2002 | Nozawa et al. |
| 6,644,025 | B1 | 11/2003 | Oberhausser et al. |
| 6,775,974 | B2 | 8/2004 | Tabor |
| 6,895,852 | B2 | 5/2005 | Pieper |
| 7,275,370 | B2 | 10/2007 | Hesse et al. |
| 7,434,393 | B2 | 10/2008 | Hesse |
| 7,481,051 | B2 | 1/2009 | Bergquist |
| 7,854,115 | B2 | 12/2010 | Pack et al. |
| 8,006,490 | B2 | 8/2011 | Kauss |
| 8,479,769 | B2 | 7/2013 | Rub |
| 8,869,520 | B2 | 10/2014 | Vigholm et al. |
| 9,091,281 | B2 | 7/2015 | Quinnell et al. |
| 9,200,646 | B2 | 12/2015 | Weickert et al. |
| 9,404,483 | B2 | 8/2016 | Kauss |
| 9,429,175 | B2 | 8/2016 | Coolidge |
| 9,506,222 | B2 | 11/2016 | Britten et al. |
| 9,506,480 | B2 | 11/2016 | Hiraku et al. |
| 9,759,212 | B2 | 9/2017 | Lingenfelter et al. |
| 10,024,342 | B2 | 7/2018 | Terao et al. |
| 10,100,495 | B2 | 10/2018 | Takahashi et al. |
| 10,184,228 | B2 | 1/2019 | Ito et al. |
| 10,260,531 | B2 | 4/2019 | Kondo et al. |
| 10,323,458 | B2 | 6/2019 | Chiaramonte et al. |
| 10,378,184 | B2 | 8/2019 | Vigholm |
| 10,392,780 | B2 | 8/2019 | Sugano et al. |
| 10,912,245 | B2 | 2/2021 | Stovall et al. |
| 11,143,211 | B1 | 10/2021 | Pintore et al. |
| 11,261,582 | B1 | 3/2022 | Andreuccetti et al. |
| 11,313,388 | B1 | 4/2022 | Pintore et al. |
| 11,378,102 | B1 | 7/2022 | Quinn et al. |
| 11,530,524 | B2 | 12/2022 | Pintore et al. |
| 2008/0295508 | A1 | 12/2008 | Ma et al. |
| 2010/0307606 | A1* | 12/2010 | Russell ............... F15B 13/0832 137/82 |
| 2013/0280097 | A1 | 10/2013 | Narotham |
| 2015/0027112 | A1 | 1/2015 | Takebayashi et al. |
| 2016/0032566 | A1 | 2/2016 | Taddia et al. |
| 2017/0274930 | A1 | 9/2017 | Zhang et al. |
| 2018/0347153 | A1* | 12/2018 | Hatanaka .............. F15B 11/165 |
| 2019/0177952 | A1 | 6/2019 | Ito et al. |
| 2020/0208378 | A1 | 7/2020 | Quan et al. |
| 2021/0131455 | A1 | 5/2021 | Szeles et al. |
| 2021/0231140 | A1 | 7/2021 | Ziemens et al. |
| 2021/0309287 | A1 | 10/2021 | Zhang et al. |

FOREIGN PATENT DOCUMENTS

| | | | |
|---|---|---|---|
| EP | 2320094 | A2 | 5/2011 |
| EP | 3076028 | A1 | 10/2016 |
| FR | 3054008 | A1 | 1/2018 |
| WO | WO2016/091528 | A1 | 6/2016 |

OTHER PUBLICATIONS

Borghi et al., Energy Saving in the Hydraulic Circuit for Agricultural Tractors: Focus on the Power Supply Group, Scientific Proceedings XXIII International Scientific-Technical Conference, Jun. 30, 2015, 7 pages. https://trans-motauto.com/sbornik/2015/1/08.ENERGY%20SAVING%20IN%20THE%20HYDRAULIC%20CIRCUIT%20FOR%20AGRICULTURAL%20TRACTORS%20-%20FOCUS%20ON%THE%POWER%SUPPLY%20GROUP.pdf.

Cheng et al., A Multi-Mode Electronic Load Sensing Control Scheme with Power Limitation and Pressure Cut-Off for Mobile Machinery, Chinese Journal of Mechanical Engineering, vol. 36 Article No. 29, 2023, 14 pages. Retrieved Aug. 11, 2023 from: https://cjme.springeropen.com/articles/10.1186/s10033-023-00861-1.

Eaton, Technical Information Mobile Valves, Proportional—Load Sensing, 50 pages. Retrieved on Aug. 11, 2023 from https://www.eaton.com/ecm/groups/public/@pub/@eaton/@hyd/documents/content/pct_4152034.pdf.

Henry Pratt Company, Sleeve—Energy Dissipating Valve Specifications, Mueller Water Products, Inc., 2019, 2 pages. https://www.henrypratt.com/products/energy-dissipating-valves/sleeve/sleeve/.

OLPP, Limiting the Local Pressure in Post-Compensated Valves, Bucher Hydraulics, Nov. 6, 2017, 2 pages. https://www.bucherhydraulics.com/50862/NewsBlog/Overview/HDS24/blog.aspx.

Ross 1879 Valve, Energy Dissipating Solutions, Sep. 5, 2019, 6 pages. http://www.rossvalve.com/assets/MOV_Brochure_2008.pdf.

* cited by examiner

SYSTEM AND METHOD FOR CONTROLLING HYDRAULIC FLUID FLOW WITHIN A WORK VEHICLE

FIELD OF THE INVENTION

The present disclosure generally relates to hydraulic systems for work vehicles, such as construction vehicles and/or other work vehicles, and, more particularly, to systems and methods for controlling hydraulic fluid flow within a work vehicle for lower hydraulic loads to increase stability within the system.

BACKGROUND OF THE INVENTION

A work vehicle, such as a wheel loader, skid steer loader, backhoe loader, compact track loader, and the like, typically includes a hydraulic system to actuate various components of the vehicle. For example, the hydraulic system may raise and lower an implement, such as a bucket, at the operator's command. As such, the hydraulic system generally includes one or more hydraulic loads (e.g., hydraulic actuators, motors, and/or the like) and a pump configured to supply hydraulic fluid to the load(s).

Additionally, the hydraulic system may include various valves and other flow control devices to control the flow of the hydraulic fluid from the pump to the load(s). In this respect, the valves and other flow control devices may cause pressure drops at certain locations within the hydraulic system. To compensate for these pressure drops, the pump is controlled such that the pump discharges the hydraulic fluid at a pressure that is typically much higher than the pressure needed to operate the hydraulic load(s) based on the operator's commands. However, operating the pump in this manner increases the energy consumption of the work vehicle, thereby reducing its fuel economy.

To address this issue, U.S. Pat. No. 11,143,211 (Pintore et al) discloses a system and method for controlling hydraulic fluid flow within a work vehicle that reduces the energy consumption of the vehicle. In this regard, the system/method disclosed by U.S. Pat. No. 11,143,211 provides numerous operational advantages over pre-existing hydraulic control systems/methods. However, additional refinements and/or advancements may be desired to further enhance or improve the operational advantages of the system/method disclosed by U.S. Pat. No. 11,143,211. For instance, an improved system and method that provides increased valve/control stability in association with lower hydraulic loads while still allowing for reduced energy consumption of the work vehicle would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling hydraulic fluid flow within a work vehicle. The system includes a hydraulic load and a pump configured to supply hydraulic fluid to the hydraulic load via a fluid supply conduit. The system also includes a flow control valve fluidly coupled to the fluid supply conduit upstream of the hydraulic load, a pilot-operated compensator valve fluidly coupled to the fluid supply conduit upstream of the flow control valve, and a pilot conduit fluidly coupled to the pilot-operated compensator valve such that the pilot conduit is configured to supply a pilot flow of hydraulic fluid to the pilot-operated compensator valve. Additionally, the system includes a first pilot source conduit fluidly coupled to the fluid supply conduit downstream of the flow control valve and a second pilot source conduit fluidly coupled to the fluid supply conduit upstream of the pilot-operated compensator valve, with the first pilot source conduit configured to receive a first pilot flow of the hydraulic fluid from the fluid supply conduit and the second pilot source conduit configured to receive a second pilot flow of the hydraulic fluid from the fluid supply conduit. Moreover, the system includes a pilot selector valve configured to selectively fluidly couple the pilot conduit to either the first pilot source conduit or the second pilot source conduit such that a source of the pilot flow supplied to the pilot-operated compensator valve is either the first pilot flow or the second pilot flow.

In another aspect, the present subject matter is directed to a method for controlling hydraulic fluid flow within a hydraulic system of a work vehicle. The method includes operating a pump to supply hydraulic fluid at a pump supply pressure selected as a function of a highest load pressure of the hydraulic system. The hydraulic fluid is supplied to a hydraulic load via a fluid supply conduit. The hydraulic system includes a flow control valve fluidly coupled to the fluid supply conduit upstream of the hydraulic load and a pilot-operated compensator valve fluidly coupled to the fluid supply conduit upstream of the flow control valve, with the pilot-operated compensator valve being fluidly coupled to a pilot conduit such that the pilot conduit is configured to supply a pilot flow of hydraulic fluid to the pilot-operated compensator valve. Additionally, the method includes determining, with a computing system, whether a load pressure associated with the hydraulic load corresponds to the highest load pressure of the hydraulic system, and controlling, with the computing system, an operation of a pilot selector valve to fluidly couple the pilot conduit to either a first pilot source conduit or a second pilot source conduit based on the determination of whether the hydraulic load corresponds to the highest load pressure.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
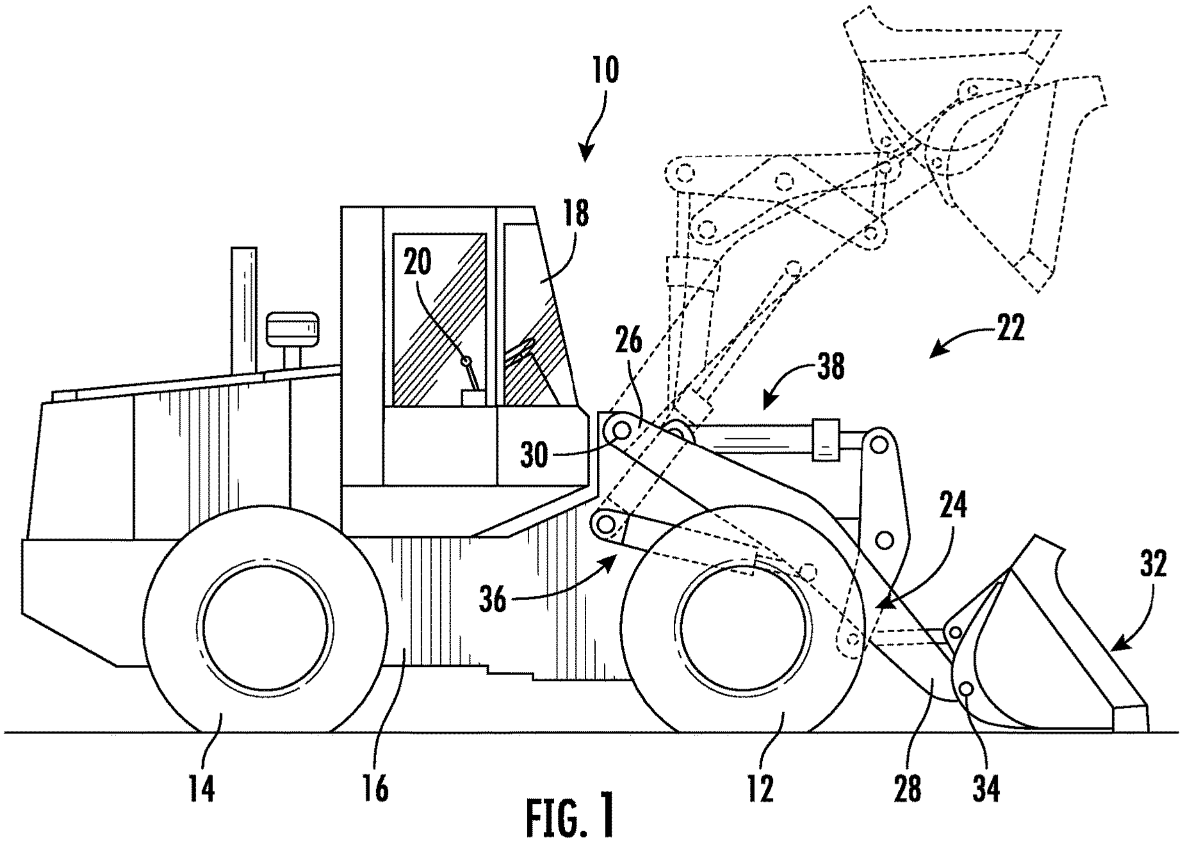
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling hydraulic fluid flow within a work vehicle. As will be described below, the system may provide increased valve stability for lower hydraulic loads while still allowing for reduced energy consumption of the work vehicle.

In several embodiments, improved efficiency gains may be achieved by using at least one of a load sense valve provided in association with a load sense circuit of the hydraulic system or pilot conduit valves provided in association with a pilot flow being delivered to compensator valves of the hydraulic system. For example, as will be described below, the load sense valve may, in one embodiment, be used to adjust (e.g., lower) the pressure of a bleed flow within the load sense circuit, thereby decreasing the margin pressure setting of the pump and resulting in a lower pump supply pressure being output from the pump. Additionally, in one embodiment, the pilot conduit valves may be used to adjust the pressure of the pilot flow being delivered to each respective compensator valve.

As will be described below, the present subject matter introduces pilot selector valves that allow for the selection of the source of the pilot flow being delivered to the compensator valves. Specifically, the pilot selector valves allow for the source of the pilot flow to be selected between a source deriving from a location downstream of the system's flow control valve (e.g., such that the source pressure corresponds to the load pressure of the associated hydraulic load) and a source deriving from a location upstream of the system's compensator valve (e.g., such that the source pressure corresponds to the pump supply pressure). In this regard, for the hydraulic load associated with the highest load pressure, the respective pilot selector valve can be controlled such that the source of the pilot flow being delivered to the corresponding compensator valve is downstream "load pressure" source. However, for any other hydraulic load(s) within the system having a smaller load pressure(s), the respective pilot selector valve(s) can be controlled such that the source of the pilot flow being delivered to the corresponding compensator valve is the upstream "pump supply pressure" source, thereby allowing a higher source pressure to be supplied through the associated conduit(s). This higher source pressure for the pilot flow(s) being delivered to the compensator valve(s) associated with the lower hydraulic load(s) allows for the pressure drop across the compensator valve(s) to be reduced significantly, thereby allowing for a significant reduction in the valve dynamics and/or instabilities that would have otherwise occurred if the source pressure had been equal to the lower load pressure. As will be described below, to account for the reduction in the pressure drop across the compensator valve, the downstream flow control valve can be actively controlled to increase the pressure drop across such valve so that the cumulative pressure drop across both valves equals the required pressure drop for the associated hydraulic load. Such control allows for the pressure drop to be balanced or distributed across the compensator valve and the flow control valve (as opposed to being carried primarily by the compensator valve), thereby reducing valve/flow dynamics and increasing control stability for the system.

It should be appreciated that, by introducing the pilot selector valves, the presently disclosed system/method may provide certain advantages to the system/method disclosed in U.S. Pat. No. 11,143,211 (hereinafter referred to as "the '211 patent"), the disclosure of which is hereby incorporated by reference herein in its entirety for all purposes. Specifically, in the system/method of the '211 patent, the pilot flow being delivered to the system's compensator valves derives solely from a pilot conduit fluidly coupled to the fluid supply conduit downstream of the flow control valve such that the fluid pressure within the pilot conduit corresponds to the load pressure of the associated hydraulic load. In this regard, for the hydraulic loads within the system of the '211 patent having smaller load pressures than the hydraulic load with the highest load pressure, a substantial difference can exist between the load pressure being supplied through the pilot conduit and the pump supply pressure being delivered to the compensator valve. This substantial pressure difference can result in a significant pressure drop across the compensator valve, which, in turn, can lead to valve/control instability due to vibration, noise/heat generation, high flow forces, etc. as the compensator valve tries to maintain the required pressure drop.

Referring now to the drawings, FIG. 1 illustrates a side view of one embodiment of a work vehicle 10. As shown, the work vehicle 10 is configured as a wheel loader. However, in other embodiments, the work vehicle 10 may be configured as any other suitable work vehicle known in the art, such as any other construction vehicle (e.g., any other type of front loader, such as skid steer loaders, backhoe loaders, compact track loaders, and/or the like) or agricultural vehicle (e.g., a tractor, sprayer, harvester, and/or the like).

As shown in FIG. 1, the work vehicle 10 includes a pair of front wheels 12, a pair or rear wheels 14, and a chassis 16 coupled to and supported by the wheels 12, 14. An operator's cab 18 may be supported by a portion of the chassis 16 and may house various control or input devices (e.g., levers, pedals, control panels, buttons and/or the like) for permitting an operator to control the operation of the work vehicle 10. For instance, as shown in FIG. 1, the work vehicle 10 includes one or more control levers 20 for controlling the operation of one or more components of a lift assembly 22 of the work vehicle 10.

As shown in FIG. 1, the lift assembly 22 includes a pair of loader arms 24 (one of which is shown) extending lengthwise between a first end 26 and a second end 28. In this respect, the first ends 26 of the loader arms 24 may be pivotably coupled to the chassis 16 at pivot joints 30. Similarly, the second ends 28 of the loader arms 24 may be pivotably coupled to a suitable implement 32 of the work vehicle 10 (e.g., a bucket, fork, blade, and/or the like) at pivot joints 34. In addition, the lift assembly 22 may also include a plurality of hydraulic actuators for controlling the movement of the loader arms 24 and the implement 32. For instance, the lift assembly 22 may include a pair of hydraulic lift cylinders 36 (one of which is shown) coupled between the chassis 16 and the loader arms 24 for raising and lowering the loader arms 24 relative to the ground. Moreover, the lift assembly 22 may include a pair of hydraulic tilt cylinders 38 (one of which is shown) for tilting or pivoting the implement 32 relative to the loader arms 24.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, the work vehicle 10 was described above as including a pair of lift cylinders 36 and a pair of tilt cylinders 38. However, in other embodiments, the work vehicle 10 may, instead, include any number of lift cylinders 36 and/or tilt cylinders 38, such as by only including a single lift cylinder 36 for controlling the movement of the loader arms 24 and/or a single tilt cylinder 38 for controlling the movement of the implement 32. Additionally, in some embodiments, the work vehicle 10 may include other hydraulic actuators to actuate or otherwise operate other components of the vehicle 10. Furthermore, as indicated above, in some embodiments, the work vehicle 10 may be configured as an agricultural vehicle, such as a tractor. In such embodiments, the hydraulic actuators may correspond to any suitable hydraulic actuators on the vehicle or an associated implement.

Figure 2:
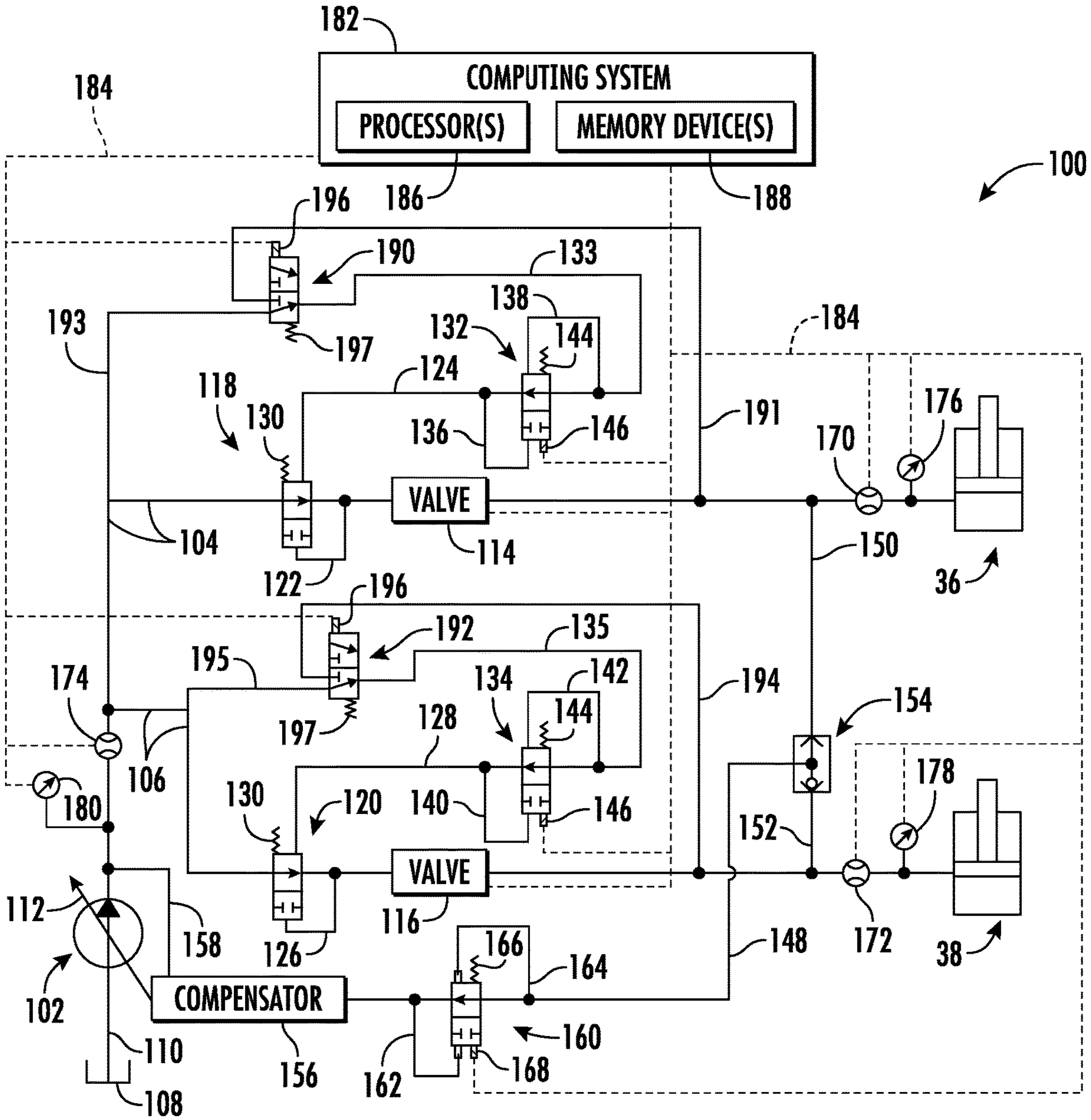
FIG. 2 illustrates a schematic view of one embodiment of a system for controlling hydraulic fluid flow within a work vehicle in accordance with aspects of the present subject matter.

Referring now to FIG. 2, a schematic view of one embodiment of a system 100 for controlling hydraulic fluid flow within a work vehicle is illustrated in accordance with aspects of the present subject matter. In general, the system 100 will be described herein with reference to the work vehicle 10 described above with reference to FIG. 1. However, it should be appreciated by those of ordinary skill in the art that the disclosed system 100 may generally be utilized with work vehicles having any other suitable vehicle configuration. For purposes of illustration, hydraulic connections between components of the system 100 are shown in solid lines while electrical connections between components of the system 100 are shown in dashed lines.

In several embodiments, as shown in FIG. 2, the system 100 may include one or more hydraulic loads of the work vehicle 10. In this respect, as will be described below, the system 100 may be configured to regulate or otherwise control the hydraulic fluid flow within the work vehicle 10 such that the hydraulic fluid is supplied to the load(s) of the vehicle 10 in a manner that reduces the energy consumption of the vehicle 10 while enhancing valve stability (and, thus, reducing noise generation and vibration) for the valves associated with the lower hydraulic loads within the system. For example, in the illustrated embodiment, the system 100 includes the lift cylinders 36 and the tilt cylinders 38 of the work vehicle 10. In such an embodiment, the lift cylinder 36 and the tilt cylinder 38 may be in parallel with each other. However, in alternative embodiments, the system 100 may include any other suitable hydraulic loads of the work vehicle 10 in addition to or in lieu of the lift and tilt cylinders 36, 38, such as hydraulic actuators associated with other implements (e.g., a backhoe assembly), stabilizer legs, and/or the like and/or hydraulic motors.

As shown in FIG. 2, the system 100 may include a pump 102 configured to supply hydraulic fluid to the hydraulic load(s) of the vehicle 10. Specifically, in several embodiments, the pump 102 may be configured to supply hydraulic fluid to the lift cylinders 36 of the vehicle 10 via a first fluid supply conduit 104 and the tilt cylinders 38 of the vehicle 10 via a second fluid supply conduit 106. However, in alternative embodiments, the pump 102 may be configured to supply hydraulic fluid to any other suitable hydraulic loads of the vehicle 10. Additionally, the pump 102 may be in fluid communication with a fluid tank or reservoir 108 via a pump conduit 110 to allow hydraulic fluid stored within the reservoir 108 to be pressurized and supplied to the lift and tilt cylinders 36, 38.

In several embodiments, the pump 102 may be a variable displacement pump configured to discharge hydraulic fluid across a given pressure range. Specifically, the pump 102 may supply pressurized hydraulic fluid within a range bounded by a minimum pressure and a maximum pressure capability of the variable displacement pump. In this respect, a swash plash plate 112 may be configured to be controlled mechanically via a load sense conduit 148 to adjust the position of the swash plate 112 of the pump 102, as necessary, based on the highest load applied to the hydraulic system of the vehicle 10. However, in other embodiments, the pump 102 may correspond to any other suitable pressurized fluid source. Moreover, the operation of the pump 102 may be controlled in any other suitable manner.

Furthermore, the system 100 may include one or more flow control valves. In general, the flow control valve(s) may be fluidly coupled to a fluid supply conduit(s) upstream of the corresponding hydraulic load such that the flow control valve(s) is configured to control the flow rate of the hydraulic fluid to the load(s). Specifically, in several embodiments, the system 100 may include a first flow control valve 114 fluidly coupled to the first fluid supply conduit 104 upstream of the lift cylinders 36. The first flow control valve 114 may, in turn, define an adjustable orifice (not shown). In this respect, by adjusting the cross-sectional area of the orifice, the first flow control valve 114 can control the flow rate of the hydraulic fluid to the lift cylinders 36. Moreover, in such embodiments, the system 100 may include a second flow control valve 116 fluidly coupled to the second fluid supply conduit 106 upstream of the tilt cylinders 38. The second flow control valve 116 may, in turn, define an adjustable orifice. As such, by adjusting the cross-sectional area of the orifice, the second flow control valve 116 can control the flow rate of the hydraulic fluid to the tilt cylinders 38.

The first and second flow control valves 114, 116 may be configured as any suitable valves defining adjustable orifices. For example, in one embodiment, first and second flow control valves 114, 116 may be proportional directional valves. Such valves 114, 116 may include actuators (e.g., solenoid actuators) configured to adjust the cross-sectional areas of the orifices in response to receiving control signals, such as from a computing system 182. The details of the computing system 182 will be described in greater detail below.

Additionally, the system 100 may include one or more compensator valves. Specifically, in several embodiments, the system 100 may include a first compensator valve 118 fluidly coupled to the first fluid supply conduit 104 upstream of the lift cylinders 36 and the first flow control valve 114. Moreover, in such embodiments, the system 100 may include a second compensator valve 120 fluidly coupled to the second fluid supply conduit 106 upstream of the tilt cylinders 38 and the second flow control valve 116. Thus, in such embodiments, the system 100 is a pre-compensated system.

In several embodiments, the first and second compensator valves 118, 120 may be pilot-operated valves. More specifically, a pilot conduit 122 may be fluidly coupled to the first compensator valve 118 and the first fluid supply conduit 104 downstream of the first compensator valve 118 (and upstream of the first flow control valve 114). As such, the pilot conduit 122 may provide a pilot flow of hydraulic fluid from downstream of the first compensator valve 118 to the valve 118 (and upstream of the first flow control valve 114). Furthermore, a pilot conduit 124 may be fluidly coupled to the first compensator valve 118 along the opposed side of the valve spool as the pilot conduit 122 to provide an opposing pilot force against the spool. As will be described below, the source of the pilot flow provided through the pilot conduit 124 to the first compensator valve 118 may be selected based at least in part on whether a load pressure for the hydraulic load associated with such compensator valve 118 (e.g., the lift cylinder 36) corresponds to the highest load pressure for the system 100. Similarly, a pilot conduit 126 may be fluidly coupled to the second compensator valve 120 and the second fluid supply conduit 106 downstream of the second compensator valve 120 (and upstream of the second flow control valve 116). As such, the pilot conduit 126 may provide a pilot flow of hydraulic fluid from upstream of the second compensator valve 120 to the valve 120 (and upstream of the second flow control valve 116). Furthermore, a pilot conduit 128 may be fluidly coupled to the second compensator valve 120 along the opposed side of the valve spool as the pilot conduit 126 to provide an opposing pilot force against the spool. As will be described below, the source of the pilot flow provided through the pilot conduit 128 to the second compensator valve 120 may be selected based at least in part on whether a load pressure for the hydraulic load associated with such compensator valve 120 (e.g., the tilt cylinder 38) corresponds to the highest load pressure for the system 100. Additionally, the first and second compensator valves 118, 120 may have biasing elements 130, such as springs, that set a compensator valve margin.

In general, the first and second compensator valves 118, 120 may be configured to regulate the pressure drop of the hydraulic fluid across the first and second flow control valves 114, 116, respectively. More specifically, the first compensator valve 118 may adjust the pressure within the first fluid supply conduit 104 such that the pressure of the hydraulic fluid supplied from the valve 118 to the downstream flow control valve 114 is equal to the sum of the compensator margin and the pressure of the pilot flow supplied to the valve 118 by the pilot conduit 124. Similarly, the second compensator valve 120 may adjust the pressure within the second fluid supply conduit 106 such that the pressure of the hydraulic fluid supplied from the valve 120 to the downstream flow control valve 116 is equal to the sum of the compensator margin and the pressure of the pilot flow supplied to the valve 120 by the pilot conduit 128. As will be described below, because the compensator margin set by the biasing elements 130 is fixed, the pressure drop across the first and second flow control valves 114, 116 can be controlled by adjusting the pressure of the pilot flows within the pilot conduits 124, 128, respectively. Such adjustment of the pressures within the pilot conduits 124, 128 may, in turn, reduce the energy consumption of the work vehicle 10. Moreover, by carefully selecting the source of the pilot flow supplied through the pilot conduit 124, 128 associated with the lower hydraulic load(s), the pressure differential across the corresponding compensator valve 118, 120 may be reduced significantly, thereby increasing the valve/control stability within the system. For example, the reduced pressure drop across the compensator valve 118, 120 may result in decreased vibration and flow dynamics, as well as decreased noise and heat generation. In such instance, the remaining pressure drop can be achieved by the associated flow control valve 114, 116, thereby allowing the required pressure drop to be balanced or distributed across the compensator valve 118, 120 and its respective flow control valve 114, 116.

Referring still to FIG. 2, the system 100 may also include one or more pilot conduit valves. Specifically, in several embodiments, the system 100 may include a first pilot conduit valve 132 fluidly coupled to the pilot conduit 124. Additionally, the system 100 may include a second pilot conduit valve 134 fluidly coupled to the pilot conduit 128. As will be described below, the first and second pilot conduit valves 132, 134 may be used to adjust the pressures of the pilot flows within the pilot conduits 124, 128.

In several embodiments, the first and second pilot conduit valves 132, 134 may be pilot-operated valves. More specifically, a pilot conduit 136 may be fluidly coupled to the first pilot conduit valve 132 and the pilot conduit 124 downstream of the valve 132. As such, the pilot conduit 136 may provide a pilot flow of hydraulic fluid from downstream of the first pilot conduit valve 132 to the valve 132. Furthermore, a pilot conduit 138 may be fluidly coupled to the first pilot conduit valve 132 and a first pilot input conduit 133 upstream of the valve 132. As such, the pilot conduit 138 may provide a pilot flow of hydraulic fluid from upstream of the first pilot conduit valve 132 to the valve 132. Similarly, a pilot conduit 140 may be fluidly coupled to the second pilot conduit valve 134 and the pilot conduit 128 downstream of the valve 134. As such, the pilot conduit 140 may provide a pilot flow of hydraulic fluid from downstream of the second pilot conduit valve 134 to the valve 134. Furthermore, a pilot conduit 142 may be fluidly coupled to the second pilot conduit valve 134 and a second pilot input conduit 135 upstream of the valve 134. As such, the pilot conduit 142 may provide a pilot flow of hydraulic fluid from upstream of the second pilot conduit valve 134 to the valve 134. Additionally, the first and second pilot conduit valves 132, 134 may have biasing elements 144, such as springs, that set a valve margin.

In addition to being pilot-operated (or as an alternative thereto), the first and second pilot conduit valves 132, 134 may be electronically-activated valves. For example, as shown in FIG. 2, the first and second pilot conduit valves 132, 134 may include electric actuators 146, such as solenoids. In general, the electric actuators 146 may be electronically controlled by the computing system 182 to selectively override the pilot operation of the valves 132, 134. In this respect, when the electric actuators 146 are not activated, the first and second pilot conduit valves 132, 134 may be controlled mechanically based on the corresponding pilot flows. Specifically, in such instances, the first and second pilot conduit valves 132, 134 may adjust the pressure within the pilot conduits 124, 128 such that the pressure of the hydraulic fluid downstream of the valves 132, 134 is equal to the sum of the valve margins and the source pressure of the pilot flow supplied to the valves 132, 134 via the respective upstream pilot input conduits 133, 135 fluidly coupled to the valves 132, 134. As shown in FIG. 2, the first pilot input conduit 133 is fluidly coupled to the first pilot conduit valve 132 such that pressurized hydraulic fluid is supplied to the first pilot conduit valve 132 via the first pilot input conduit 133 and is expelled from the first pilot conduit valve 132 into the associated pilot conduit 124. Similarly, the second pilot input conduit 135 is fluidly coupled to the second pilot conduit valve 134 such that pressurized hydraulic fluid is supplied to the second pilot conduit valve 134 via the second pilot input conduit 135 and is expelled from the second pilot conduit valve 134 into the associated pilot conduit 126. Conversely, when the electric actuators 146 are activated, the electric actuators 146 may be controlled to override the pilot control, specifically to control the valve position of each respective pilot conduit valve 132, 134 to selectively reduce the hydraulic pressure being supplied to the downstream pilot conduits 124, 126. For instance, each actuator 146 may be selectively controlled to adjust the valve position of its respective pilot conduit valve 132, 134 such that the pressure of the hydraulic fluid supplied to the valve 132, 134 (via its associated pilot input conduit 133, 135) is reduced for subsequent delivery to the corresponding pilot conduit 124, 128.

In several embodiments, to select the source of the hydraulic fluid being supplied as a pilot flow to each compensator valve 118, 120, the system may include corresponding pilot selector valves 190, 192. Specifically, as shown in FIG. 2, a first pilot selector valve 190 is fluidly coupled to the pilot conduit 124 (e.g., via the first pilot input conduit 133 upstream of the first pilot conduit valve 132) and is configured to selectively fluidly couple the pilot conduit 124 (and, thus, the downstream compensator valve 118) to the fluid supply conduit 104 either at a location downstream of the first flow control valve 114 (e.g., via a first downstream pilot source conduit 191) or at a location upstream of the first compensator valve 118 (e.g., via a first upstream pilot source conduit 193). Similarly, a second pilot selector valve 192 is fluidly coupled to the pilot conduit 128 (e.g., via the second pilot input conduit 135 upstream of the second pilot conduit valve 134) and is configured to selectively fluidly couple the pilot conduit (and, thus, the downstream compensator valve 120) to the second supply conduit 106 either at a location downstream of the second flow control valve 116 (e.g., via a second downstream pilot source conduit 194) or at a location upstream of the second compensator valve 120 (e.g., via a second upstream pilot source conduit 195).

In several embodiments, the pilot selector valves 190, 192 may be electronically-activated valves. For example, as shown in FIG. 2, the first and second pilot selector valves 190, 192 may include electric actuators 196, such as solenoids, as well as opposing biasing elements 197, such as springs. In general, the electric actuators 196 may be electronically controlled by the computing system 182 to selectively fluidly couple each downstream pilot conduit 124, 128 to either the respective upstream pilot source conduit 193, 195 or the respective downstream pilot source conduit 191, 194. For instance, in the illustrated embodiment, when the electric actuators 196 are not activated, the biasing elements 197 may be configured to bias the pilot selector valves 190, 192 into a first position at which the pilot selector valves 190, 192 are configured to fluidly couple each pilot conduit 124, 128 (and, thus, the downstream compensator valve 118, 120) to its respective upstream pilot source conduit 193, 195. At such positions, hydraulic fluid may be supplied to each pilot source conduit 193, 195 at a pressure that is equal to the pump supply pressure being delivered to the supply conduits 104, 106 via the pump 102. Similarly, when the electric actuators 196 are activated, the actuators 196 may be configured to actuate the pilot selector valves 190, 192 into a second position at which the pilot selector valves 190, 192 are configured to fluidly couple each pilot conduit 124, 128 (and, thus, the downstream compensator valve 118, 120) to its respective downstream pilot source conduit 191, 194. At such positions, hydraulic fluid may be supplied to each pilot input conduit 133, 135 at a pressure that is equal to the load pressure of the associated hydraulic load (i.e., the fluid pressure of the hydraulic fluid being supplied to each cylinder 36, 38 via its respective flow control valve 114, 116). Alternatively, the configuration of pilot selector valves 190, 192 may be reversed such that the biasing elements 197 bias the valves 190, 192 into their second positions, in which case the actuators 196 may be used to actuate the valves 190, 192 into their first positions. Regardless, by controlling the operation of the actuators 196 (e.g., by activating or deactivating the actuators 196), the source of the hydraulic fluid being delivered to the compensator valves 118, 120 as a pilot flow may be selected such that the source pressure for the pilot flow is equal to either the pump supply pressure or the associated load pressure for the respective hydraulic load. As indicated above, the operation of the pilot selector valve 190, 192 associated with the highest hydraulic load for the system 100 may be controlled to fluidly couple the associated pilot conduit 124, 128 to its respective downstream pilot source conduit 191, 194 to allow the source pressure for the pilot flow to be equal to associated load pressure. However, the operation of the pilot selector valve 190, 192 associated with the lower hydraulic load(s) may be controlled to fluidly couple the associated pilot conduit 124, 128 to allow the source pressure for the pilot flow to be equal to the pump supply pressure, which may allow the pressure differential across the corresponding compensator valve 118, 120 to be reduced to minimize flow dynamics and increase valve/control stability within the system 100.

Referring still to FIG. 2, the system 100 may also include a load sense conduit 148. In general, the load sense conduit 148 may receive hydraulic fluid bled from the first or second fluid supply conduit 104, 106 having the highest pressure therein. More specifically, the system 100 may include a first bleed conduit 150 fluidly coupled to the first fluid supply conduit 104 downstream of the first flow control valve 114 and the first compensator valve 118. Furthermore, the system 100 may include a second bleed conduit 152 fluidly coupled to the second fluid supply conduit 106 downstream of the second flow control valve 116 and the second compensator valve 120. Thus, the first bleed conduit 150 may receive hydraulic fluid bled from the first fluid supply conduit 104 and the second bleed conduit 152 may receive hydraulic fluid bled from the second fluid supply conduit 106. Additionally, the system 100 may include a shuttle valve 154 fluidly coupled to the first and second bleed conduits 150, 152 and the load sense conduit 148. The shuttle valve 154 may, in turn, be configured to supply hydraulic fluid from the first or second bleed conduit 150, 152 having the highest pressure therein to the load sense conduit 148. In this respect, the hydraulic fluid supplied to the load sense conduit 148 may have the same pressure as the fluid supply conduit 104, 106 having the highest pressure therein.

The hydraulic fluid within the load sense conduit 148 may be indicative of the load on the hydraulic system of the vehicle 10 and, thus, may be used to control the operation of the pump 102. More specifically, the load sense conduit 148 may supply the hydraulic fluid therein to a pump compensator 156. The pump compensator 156 may also receive hydraulic fluid bled from the first and/or second fluid supply conduits 104, 106 upstream of the flow control valves 114, 116 and compensator valves 118, 120 via a bleed conduit 158. Additionally, the pump compensator 156 may have an associated a pump margin. In this respect, the pump compensator 156 may control the operation of the pump 102 such that the pump 102 discharges hydraulic fluid at a pressure that is equal to the sum of the pump margin and the pressure of the hydraulic fluid received from the load sense conduit 148 (i.e., the highest load pressure).

In this illustrated embodiment, the pump compensator 156 corresponds to a mechanical device. For instance, the pump compensator 156 may correspond to a passive hydraulic cylinder coupled to the swash plate 112 of the pump 102. In such an embodiment, hydraulic fluid from the load sense conduit 148 is supplied to one chamber of the cylinder and hydraulic fluid from the bleed conduit 158 is supplied to the other chamber of the cylinder. Moreover, the pump compensator 156 may include a biasing element, such as a spring, in association within the cylinder to set the pump margin. In this respect, when the sum of the pressure received from the load sense conduit 148 and the pump margin exceeds the pressure within the bleed conduit 158, the pump compensator 156 may move the swash plate 112 to increase the pressure of the hydraulic fluid discharged by the pump 102. Conversely, when the sum of the pressure received from the load sense conduit 148 and the pump margin falls below the pressure within the bleed conduit 158, the pump compensator 156 may move the swashplate 112 to decrease the pressure of the hydraulic fluid discharged by the pump 102.

Additionally, the system 100 may include a load sense valve 160 fluidly coupled to the load sense conduit 148. In general, the load sense valve 160 may be configured to selectively reduce the pressure of the hydraulic fluid within the load sense conduit 148. Specifically, in several embodiments, the load sense valve 160 may be fluidly coupled to the load sense conduit 148 between the shuttle valve 154 and the pump compensator 156. In this respect, the load sense valve 160 may be configured to selectively reduce the pressure of the hydraulic fluid supplied to the pump compensator 156 by the load sense conduit 148 to a pressure that is less than the pressure of the hydraulic fluid supplied to the load sense conduit 148 by the shuttle valve 154. By reducing the pressure of the hydraulic fluid supplied to the pump compensator 156, the energy consumption of the vehicle 10 may be decreased.

In several embodiments, the load sense valve 160 may be a pilot-operated valve. More specifically, a pilot conduit 162 may be fluidly coupled to the load sense valve 160 and the load sense conduit 148 downstream of the valve 160. As such, the pilot conduit 162 may provide a pilot flow of hydraulic fluid from downstream of the load sense valve 160 to the valve 160. Furthermore, a pilot conduit 164 may be fluidly coupled to the load sense valve 160 and the load sense conduit 148 upstream of the valve 160. As such, the pilot conduit 164 may provide a pilot flow of hydraulic fluid from upstream of the load sense valve 160 to the valve 160. Additionally, the load sense valve 160 may have a biasing element 166, such as a spring, that sets a valve margin.

Furthermore, in some embodiments, in addition to being pilot-operated, the load sense valve 160 may also include an electric actuator 168, such as a solenoid. In general, the electric actuator 168 may be electronically controlled by the computing system 182 to selectively override the pilot operation of the load sense valve 160. In this respect, when the electric actuator 168 is not activated, the load sense valve 160 may be controlled hydraulically based on the received pilot flows. Specifically, in such instances, the load sense valve 160 may adjust the pressure within the load sense conduit 148 such that the pressure of the hydraulic fluid downstream of the valve 160 is equal to the valve margin subtracted from the pressure of the pilot flow supplied to the valve 160 by the pilot conduit 164. Conversely, when the when the electric actuator 168 is activated, the electric actuator 168 may control the load sense valve 160 to override the pilot control. In such instances, the load sense valve 160 may adjust the bleed flow supplied to the pump compensator 156 by the load sense conduit 148 based on various operating parameters of the system 100 and independently of the pressure within the pilot conduits 162, 164. As such, the bleed flow may be retained within the load sense conduit 148 (i.e., not directed to the reservoir 108) when the pressure of this flow is adjusted by the load sense valve 160. However, in alternative embodiments, the load sense valve 160 may be controlled in any other suitable manner and/or by any other suitable electronically controlled actuators. For example, in one embodiment, the load sense valve 160 may not be pilot-operated and, instead, may be operated solely by the electric actuators 146 (e.g., a proportional pressure-reducing valve).

In several embodiments, the system 100 may include one or more flow sensors. In general, the flow sensor(s) may be configured to capture data indicative of the flow rate of the hydraulic fluid at differing locations within the hydraulic system of the vehicle 10. Specifically, in one embodiment, a first flow sensor 170 may be fluidly coupled to the first fluid supply conduit 104 downstream of the first flow control valve 114 and the first compensator valve 118. As such, the first flow sensor 170 may be configured to capture data indicative of the flow rate of the hydraulic fluid at such location within the first fluid supply conduit 104. Furthermore, a second flow sensor 172 may be fluidly coupled to the second fluid supply conduit 106 downstream of the second flow control valve 116 and the second compensator valve 120. As such, the second flow sensor 172 may be configured to capture data indicative of the flow rate of the hydraulic fluid at such location within the second fluid supply conduit 106. Additionally, a third flow sensor 174 may be fluidly coupled to the first and/or second fluid supply conduits 104, 106 upstream of the flow control valves 114, 116 and the compensator valves 118, 120. As such, the third flow sensor 174 may be configured to capture data indicative of the flow rate of the hydraulic fluid being discharged by the pump 102.

The flow sensors may correspond to any suitable devices for capturing data indicative of the flow rates of the hydraulic fluid at the corresponding locations. For example, in the illustrated embodiment, the flow sensors 170, 172, 174 may correspond to flow meters that detect the flow rates of the hydraulic fluid at the corresponding locations. In another embodiments, the system 100 may include a single flow sensor, with the flow sensor configured to detect the rotational speed of the impeller of the pump 102. For example, in such an embodiment, the flow sensor may be a Hall Effect sensor provided in operative association with the pump shaft. The pump speed data may in combination with the pressure of the hydraulic fluid at various locations within the system 100 may allow the computing system 182 to determine or estimate the flow rate of the hydraulic fluid at such locations. In a further embodiment, the system 100 may include a single flow sensor, with the flow sensor configured to the position of the swash plate 112. For example, in such an embodiment, the flow sensor may be a potentiometer provided in operative association with the swash plate 112. The swash plate position data may in combination with the pressure of the hydraulic fluid at various locations within the system 100 may allow the computing system 182 to determine or estimate the flow rate of the hydraulic fluid at such locations.

Moreover, in several embodiments, the system 100 may include one or more pressure sensors. In general, the pressure sensor(s) may be configured to capture data indicative of the pressure of the hydraulic fluid at differing locations within the hydraulic system of the vehicle 10. Specifically, in one embodiment, a first pressure sensor 176 may be fluidly coupled to the first fluid supply conduit 104 downstream of the first flow control valve 114 and the first compensator valve 118. As such, the first pressure sensor 176 may be configured to capture data indicative of the pressure of the hydraulic fluid at such location within the first fluid supply conduit 104 (i.e., the load pressure being supplied from the first flow control valve 114 to the lift cylinder(s) 36). Furthermore, a second pressure sensor 178 may be fluidly coupled to the second fluid supply conduit 106 downstream of the second flow control valve 116 and the second compensator valve 120. As such, the second pressure sensor 178 may be configured to capture data indicative of the pressure of the hydraulic fluid at such location within the second fluid supply conduit 106 (i.e., the load pressure being supplied from the second flow control valve 116 to the tilt cylinder(s) 38). Additionally, a third pressure sensor 180 may be fluidly coupled to the first and/or second fluid supply conduits 104, 106 upstream of the flow control valves 114, 116. As such, the third pressure sensor 180 may be configured to capture data indicative of the pressure of the hydraulic fluid being discharged by the pump 102 (i.e., the pump supply pressure being supplied to the supply conduits 104, 106).

As indicated above, the system 100 may include a computing system 182 communicatively coupled to one or more components of the work vehicle 10 and/or the system 100 to allow the operation of such components to be electronically or automatically controlled by the computing system 182. For instance, the computing system 182 may be communicatively coupled to the first and second flow control valves 114, 116, the first and second pilot conduit valves 132, 134, the first and second pilot selector valves, and the load sense valve 160 via one or more communicative links 184 to allow the computing system 182 to control the operation of each respective valve. Additionally, the computing system 182 may be communicatively coupled to the flow sensors 170, 172, 174 and the pressure sensors 176, 178, 180 via one or more communicative links 184, thereby allowing the computing system 182 to receive data from these sensors 170, 172, 174, 176, 178, 180 that is indicative of the flow rates and pressures of the hydraulic fluid at the corresponding locations within the system 100.

In general, the computing system 182 may comprise one or more processor-based devices, such as a given controller or computing device or any suitable combination of controllers or computing devices. Thus, in several embodiments, the computing system 182 may include one or more processor(s) 186 and associated memory device(s) 188 configured to perform a variety of computer-implemented functions. As used herein, the term “processor” refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 188 of the computing system 182 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 188 may generally be configured to store suitable computer-readable instructions that, when implemented by the processor(s) 186, configure the computing system 182 to perform various computer-implemented functions, such as one or more aspects of the methods and algorithms that will be described herein. In addition, the computing system 182 may also include various other suitable components, such as a communications circuit or module, one or more input/output channels, a data/control bus and/or the like.

The various functions of the computing system 182 may be performed by a single processor-based device or may be distributed across any number of processor-based devices, in which instance such devices may be considered to form part of the computing system 182. For instance, the functions of the computing system 182 may be distributed across multiple application-specific controllers or computing devices, such as an implement controller, a navigation controller, an engine controller, and/or the like.

In general, the computing system 182 may be configured to control the operation of the load sense valve 160 in a manner that increases the operating efficiency of the hydraulic system. For instance, in general, the computing system may be configured to monitor the various flow rates and pressure within the system (e.g., via the data provided by the various sensors 170, 172, 174, 176, 178, 180) and subsequently control the operation of the load sense valve 160 based at least in part on the monitored flow rates and/or pressures.

In several embodiments, the computing system 182 may be configured to control the operation of the load sense valve 160 to selectively reduce the pressure of the bleed flow received by the pump compensator 156. More specifically, reducing the bleed flow within the load sense conduit 148 received by the pump compensator 156 may reduce the pressure of the hydraulic fluid discharged by the pump 102 below the pressure that would be set by the biasing element of the pump compensator 156 and the unadjusted bleed flow. For example, in certain instances, such as when the load on the vehicle’s hydraulic system is low, the load sense valve 160 may be controlled such that the pressure of the hydraulic fluid discharged by the pump 102 is reduced, thereby decreasing the energy consumption of the vehicle 10 (e.g., by reducing the load on the pump 102) and improving its fuel economy. Conversely, in other instances, such as when the load on the vehicle’s hydraulic system is high, the actuator 168 may be deactivated and the load sense valve 160 may controlled hydraulically (e.g., based on the pilot flows within pilot conduits 162, 164) to permit the system 100 to provide hydraulic fluid to the hydraulic loads (e.g., the lift and/or tilt cylinders 36, 38) at the desired pressure and flow rate.

Additionally, the computing system 182 may be configured to control the operation of the pilot selector valves 190, 192 and the pilot conduit valves 132, 134 in a manner that increases the operating efficiency of the hydraulic system while maintaining valve/control stability within the system. For instance, in general, the computing system may be configured to monitor the various flow rates and pressure within the system (e.g., via the data provided by the various sensors 170, 172, 174, 176, 178, 180) and subsequently control the operation of the pilot selector valves 190, 192 and the pilot conduit valves 132, 134 based at least in part on the monitored flow rates and/or pressures.

In several embodiments, the computing system 182 may be configured to monitor the sensor data provided by the first and second pressure sensors 176, 178 to determine the load pressures associated with each hydraulic load (e.g., the lift and tilt cylinders 36, 38). The computing system 182 may then control the operation of the pilot selector valves 190, 192 based on the load pressure data. Specifically, as indicated above, the computing system 182 may control the operation of the pilot selector valve 190, 192 associated with the hydraulic load having the highest load pressure such that the source of the pilot flow supplied to the respective compensator valve 118, 120 derives from the corresponding downstream pilot source conduit 191, 194 and, thus, the source pressure for the pilot flow corresponds to the highest load pressure. For instance, in the illustrated embodiment, the computing system 182 may be configured to activate the actuator 196 of the respective pilot selector valve 190, 192 to move the valve 190, 192 to its second position to fluidly couple the associated downstream pilot source conduit 191, 194 to the respective compensator valve 118, 120. Additionally, the computing system 182 may be configured to control the operation of the pilot conduit valve 132, 134 associated with the hydraulic load having the highest load pressure to adjust, as necessary, the pressure of the pilot flow being supplied to the respective compensator valve 118, 120. For instance, in one embodiment, the computing system 182 may be configured to deactivate the actuator 146 associated with the respective pilot conduit valve 132, 134 such that the valve 132, 134 is moved to its fully opened position, thereby allowing the pressure of the pilot flow being supplied to the associated compensator valve 118, 120 to be equal to the load pressure of the hydraulic load. Alternatively, the computing system 182 may be configured to activate the actuator 146 associated with the respective pilot conduit valve 132, 134 to allow the pressure of the pilot flow being supplied to the associated compensator valve 118, 120 to be selectively reduced from the load pressure of the hydraulic load.

Similarly, as indicated above, the computing system 182 may control the operation of the pilot selector valve 190, 192 associated with the hydraulic load having a load pressure that is lower than the highest load pressure such that the source of the pilot flow supplied to the respective compensator valve 118, 120 derives from the corresponding upstream pilot source conduit 193, 195 and, thus, the source pressure for the pilot flow corresponds to the pump supply pressure. For instance, in the illustrated embodiment, the computing system 182 may be configured to deactivate the actuator 196 of the respective pilot selector valve 190, 192 to move the valve 190, 192 to its first position to fluidly couple the associated upstream pilot source conduit 193, 195 to the respective compensator valve 118, 120. Additionally, the computing system 182 may be configured to control the operation of the pilot conduit valve 132, 134 associated with the hydraulic load having the lower load pressure to adjust, as necessary, the pressure of the pilot flow being supplied to the respective compensator valve 118, 120. For instance, the computing system 182 may be configured to activate the actuator 146 associated with the respective pilot conduit valve 132, 134 to allow the pressure of the pilot flow being supplied to the associated compensator valve 118, 120 to be selectively reduced from the pump supply pressure.

Specifically, in several embodiments, the computing system 182 may be configured to reduce the pressure of the pilot flow down to a pressure that is below the pump supply pressure but is still above the load pressure of the associated hydraulic load, thereby allowing the pressure drop across the compensator valve 118, 120 to be reduced (and thus, reduce valve/flow dynamics and increase valve/control stability). For instance, in one embodiment, the computing system 182 may be configured to reduce the pressure of the pilot flow down to a selected pressure (that is below the pump supply pressure but is still above the load pressure of the associated hydraulic load) that allows the required pressure drop for the associated hydraulic load to be balanced or distributed between the compensator valve 118, 120 and its respective flow control valve 114, 116. For instance, assuming that a cumulative pressure drop of 160 bar is required across the compensator valve 118, 120 and its respective flow control valve 114, 116, the computing system may control the operation of the associated pilot conduit valve 132, 134 such that the pressure of the pilot flow supplied to the respective compensator valve 118, 120 results in a pressure drop of 80 bar across such valve 118, 120. In such instance, the operation of the respective flow control valve 114, 116 may be controlled (e.g., by adjusting the size of its adjustable orifice) to generate a pressure drop across such flow control valve 114, 116 of 80 bar to ensure that the required cumulative pressure drop is achieved. It should be appreciated that, when balancing or distributing the pressure drop across the compensator valve 118, 120 and its respective flow control valve 114, 116, the pressure drop need to be evenly split between such valves. For instance, as opposed to a 50/50 split between the valves, the pressure drop may be distributed according to a 55/45 split, or a 60/40 split or a 65/35 split or any other suitable split that allows the pressure drop to be shared across the valves in a manner that results in reduced valve/flow dynamics (and, thus, increased valve/control stability) as compared to an instance in which the substantial majority of such pressure drop is being carried by only one of such valves (e.g., the compensator valve).

It should be appreciated that, for purposes of description, the system 100 has only been described with reference to two hydraulic loads, in which case one of such hydraulic loads would have the highest load pressure and the other hydraulic load would have a lower load pressure. However, in instances in which three or more hydraulic loads are active within the system, two or more of such hydraulic loads will likely have lower load pressure than the hydraulic load with the highest load pressure. In such instances, the pilot selector valve and pilot conduit valve associated with each of such lower hydraulic loads can be controlled in the manner described above to improve the valve/control stability associated with such valves.

Figure 3:
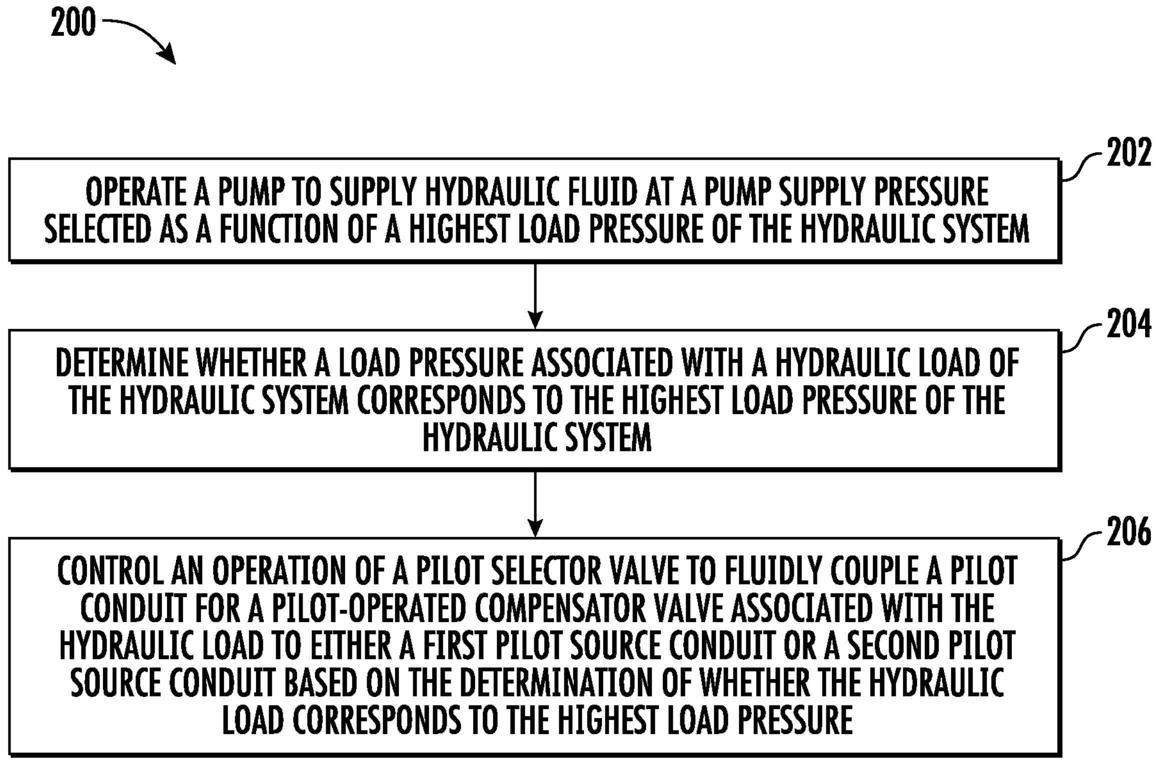
FIG. 3 illustrates a flow diagram of one embodiment of a method for controlling hydraulic fluid flow within a hydraulic system of a work vehicle in accordance with aspects of the present subject matter.

Referring now to FIG. 3, a flow diagram of one embodiment of a method 200 for controlling hydraulic fluid flow within a hydraulic system of work vehicle is illustrated in accordance with aspects of the present subject matter. In general, the method 200 will be described herein with reference to the work vehicle 10 and the system 100 described above with reference to FIGS. 1 and 2. However, it should be appreciated by those of ordinary skill in the art that the disclosed method 200 may generally be implemented with any work vehicle having any suitable vehicle configuration and/or within any system having any suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 includes operating a pump to supply hydraulic fluid at a pump supply pressure selected as a function of a highest load pressure of the hydraulic system. Specifically, as indicated above, the operation of the pump 102 may be controlled or regulated such that the pump supply pressure of the hydraulic fluid output by the pump 102 is determined or selected as a function off the highest load pressure of the hydraulic system. For instance, as noted above, the load sense circuit 148 may be configured to receive the highest load pressure within the system from the shuttle valve 154, thereby allowing the pump operation to be controlled as a function of such highest load pressure.

Additionally, at (204), the method 200 includes determining whether a load pressure associated with a hydraulic load of the hydraulic system corresponds to the highest load pressure of the hydraulic system. Specifically, as indicated above, the computing system 182 may be configured to monitor the load pressures of the various hydraulic loads (e.g., via the data provided by the pressure sensors 176, 178, 180). Based on such pressure data, the computing system 182 which hydraulic load is associated with the highest load pressure and which hydraulic load(s) is associated with lower load pressures.

Moreover, at (206) the method 200 includes controlling an operation of a pilot selector valve to fluidly couple a pilot conduit for a pilot-operated compensator valve associated with the hydraulic load to either a first pilot source conduit or a second pilot source conduit based on the determination of whether the hydraulic load corresponds to the highest load pressure. Specifically, as indicated above, when it is determined that the load pressure is less than the highest load pressure, the computing system 182 may be configured to control the operation of the pilot selector valve 190, 192 such that the source of the pilot flow supplied to the respective compensator valve 118, 120 derives from the corresponding upstream pilot source conduit 193, 195 and, thus, the source pressure for the pilot flow corresponds to the pump supply pressure. In contrast, when it is determined that the load pressure corresponds to the highest load pressure, the computing system 182 may be configured to control the operation of the pilot selector valve 190, 192 such that the source of the pilot flow supplied to the respective compensator valve 118, 120 derives from the corresponding downstream pilot source conduit 191, 194 and, thus, the source pressure for the pilot flow corresponds to the load pressure.

It is to be understood that the steps of the method 200 are performed by the computing system 182 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 182 described herein, such as the method 200, is implemented in software code or instructions which are tangibly stored on a tangible computer readable medium. The computing system 182 loads the software code or instructions via a direct interface with the computer readable medium or via a wired and/or wireless network. Upon loading and executing such software code or instructions by the computing system 182, the computing system 182 may perform any of the functionality of the computing system 182 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling hydraulic fluid flow within a work vehicle, the system comprising:

a hydraulic load;

a pump configured to supply hydraulic fluid to the hydraulic load via a fluid supply conduit;

a flow control valve fluidly coupled to the fluid supply conduit upstream of the hydraulic load;

a pilot-operated compensator valve fluidly coupled to the fluid supply conduit upstream of the flow control valve;

a pilot conduit fluidly coupled to the pilot-operated compensator valve such that the pilot conduit is configured to supply a pilot flow of the hydraulic fluid to the pilot-operated compensator valve;

a first pilot source conduit fluidly coupled to the fluid supply conduit downstream of the flow control valve, the first pilot source conduit configured to receive a first pilot flow of the hydraulic fluid from the fluid supply conduit;

a second pilot source conduit fluidly coupled to the fluid supply conduit upstream of the pilot-operated compensator valve, the second pilot source conduit configured to receive a second pilot flow of the hydraulic fluid from the fluid supply conduit;

a pilot selector valve configured to selectively fluidly couple the pilot conduit to either the first pilot source conduit or the second pilot source conduit such that a source of the pilot flow supplied to the pilot-operated compensator valve is either the first pilot flow or the second pilot flow; and a pilot conduit valve fluidly coupled to the pilot conduit downstream of the pilot selector valve, the pilot conduit valve being configured to regulate a pressure of the pilot flow supplied to the pilot-operated compensator valve through the pilot conduit.

2. The system of claim 1, wherein a fluid pressure of the first pilot flow corresponds to a load pressure associated with the hydraulic load and wherein a fluid pressure of the second pilot flow corresponds to a supply pressure of the pump.

3. The system of claim 1, wherein an operation of the pump is controlled such that the pump supplies the hydraulic fluid at a pump supply pressure determined as a function of a highest load pressure of the system, wherein an operation of the pilot selector valve is configured to be controlled such that the pilot selector valve fluidly couples the pilot conduit to either the first pilot source conduit or the second pilot source conduit based on whether a load pressure associated with the hydraulic load corresponds to the highest load pressure of the system.

4. The system of claim 3, wherein, when the load pressure associated with the hydraulic load is lower than the highest load pressure of the system, the pilot selector valve is configured to fluidly couple the pilot conduit to the second pilot source conduit such that the pilot flow supplied to the pilot-operated compensator valve derives from the second pilot flow.

5. The system of claim 3, wherein, when the load pressure associated with the hydraulic load corresponds to the highest load pressure, the pilot selector valve is configured to fluidly couple the pilot conduit to the first pilot source conduit such that the pilot flow supplied to the pilot-operated compensator valve derives from the first pilot flow.

6. The system of claim 1, further comprising a computing system configured to control an operation of the pilot selector valve to allow the pilot selector valve to selectively fluidly couple the pilot conduit to either the first pilot source conduit or the second pilot source conduit.

7. A method for controlling hydraulic fluid flow within a hydraulic system of a work vehicle, the method comprising:

operating a pump to supply hydraulic fluid at a pump supply pressure selected as a function of a highest load pressure of the hydraulic system, the hydraulic fluid being supplied to a hydraulic load via a fluid supply conduit, the hydraulic system comprising a flow control valve fluidly coupled to the fluid supply conduit upstream of the hydraulic load and a pilot-operated compensator valve fluidly coupled to the fluid supply conduit upstream of the flow control valve, the pilot-operated compensator valve being fluidly coupled to a pilot conduit such that the pilot conduit is configured to supply a pilot flow of the hydraulic fluid to the pilot-operated compensator valve;

determining, with a computing system, whether a load pressure associated with the hydraulic load corresponds to the highest load pressure of the hydraulic system; and controlling, with the computing system, an operation of a pilot selector valve to fluidly couple the pilot conduit to either a first pilot source conduit or a second pilot source conduit based on the determination of whether the hydraulic load corresponds to the highest load pressure, wherein a pilot conduit valve is fluidly coupled to the pilot conduit downstream of the pilot selector valve, the method further comprising controlling an operation of the pilot conduit valve to regulate a pressure of the pilot flow supplied to the pilot-operated compensator valve through the pilot conduit.

8. The method of claim 7, wherein the first pilot source conduit is fluidly coupled to the fluid supply conduit downstream of the flow control valve such that a first pilot flow is supplied through the first pilot source conduit, the second pilot source conduit being fluidly coupled to the fluid supply conduit upstream of the pilot-operated compensator valve such that a second pilot flow is supplied through the second pilot source conduit.

9. The method of claim 8, wherein a fluid pressure of the first pilot flow corresponds to the load pressure associated with the hydraulic load and wherein a fluid pressure of the second pilot flow corresponds to the supply pressure of the pump.

10. The method of claim 7, wherein controlling the operation of the pilot selector valve comprises controlling the operation of the pilot selector valve to fluidly couple the pilot conduit to the second pilot source conduit when the load pressure associated with the hydraulic load is less than the highest load pressure.

11. The method of claim 7, wherein controlling the operation of the pilot selector valve comprises controlling the operation of the pilot selector valve to fluidly couple the pilot conduit to the first pilot source conduit when the load pressure corresponds to the highest load pressure, wherein a fluid pressure of the hydraulic fluid supplied through the first pilot source conduit corresponds to the load pressure.

12. A system for controlling hydraulic fluid flow within a work vehicle, the system comprising:

a hydraulic load;

a pump configured to supply hydraulic fluid to the hydraulic load via a fluid supply conduit;

a flow control valve fluidly coupled to the fluid supply conduit upstream of the hydraulic load;

a pilot-operated compensator valve fluidly coupled to the fluid supply conduit upstream of the flow control valve;

a pilot conduit fluidly coupled to the pilot-operated compensator valve such that the pilot conduit is configured to supply a pilot flow of the hydraulic fluid to the pilot-operated compensator valve;

a first pilot source conduit fluidly coupled to the fluid supply conduit downstream of the flow control valve, the first pilot source conduit configured to receive a first pilot flow of the hydraulic fluid from the fluid supply conduit;

a second pilot source conduit fluidly coupled to the fluid supply conduit upstream of the pilot-operated compensator valve, the second pilot source conduit configured to receive a second pilot flow of the hydraulic fluid from the fluid supply conduit; and a pilot selector valve configured to selectively fluidly couple the pilot conduit to either the first pilot source conduit or the second pilot source conduit such that a source of the pilot flow supplied to the pilot-operated compensator valve is either the first pilot flow or the second pilot flow, wherein:

an operation of the pump is controlled such that the pump supplies the hydraulic fluid at a pump supply pressure determined as a function of a highest load pressure of the system, wherein an operation of the pilot selector valve is configured to be controlled such that the pilot selector valve fluidly couples the pilot conduit to either the first pilot source conduit or the second pilot source conduit based on whether a load pressure associated with the hydraulic load corresponds to the highest load pressure of the system; and when the load pressure associated with the hydraulic load is lower than the highest load pressure of the system, the pilot selector valve is configured to fluidly couple the pilot conduit to the second pilot source conduit such that the pilot flow supplied to the pilot-operated compensator valve derives from the second pilot flow.

13. The system of claim 12, wherein a fluid pressure of the second pilot flow corresponds to the pump supply pressure.

14. The system of claim 12, wherein a pressure of the pilot flow supplied to the pilot-operated compensator valve is greater than the load pressure associated with the hydraulic load.

15. The system of claim 12, wherein a pressure of the pilot flow supplied to the pilot-operated compensator pilot results in a reduction in a pressure drop across the pilot-operated compensator valve, wherein an operation of the flow control valve is controlled such that a pressure drop across the flow control valve is increased to accommodate at least a portion of the reduction in the pressure drop across the pilot-operated compensator valve.

16. A system for controlling hydraulic fluid flow within a work vehicle, the system comprising:

a hydraulic load;

a pump configured to supply hydraulic fluid to the hydraulic load via a fluid supply conduit;

a flow control valve fluidly coupled to the fluid supply conduit upstream of the hydraulic load;

a pilot-operated compensator valve fluidly coupled to the fluid supply conduit upstream of the flow control valve;

a pilot conduit fluidly coupled to the pilot-operated compensator valve such that the pilot conduit is configured to supply a pilot flow of the hydraulic fluid to the pilot-operated compensator valve;

a first pilot source conduit fluidly coupled to the fluid supply conduit downstream of the flow control valve, the first pilot source conduit configured to receive a first pilot flow of the hydraulic fluid from the fluid supply conduit;

a second pilot source conduit fluidly coupled to the fluid supply conduit upstream of the pilot-operated compensator valve, the second pilot source conduit configured to receive a second pilot flow of the hydraulic fluid from the fluid supply conduit; and a pilot selector valve configured to selectively fluidly couple the pilot conduit to either the first pilot source conduit or the second pilot source conduit such that a source of the pilot flow supplied to the pilot-operated compensator valve is either the first pilot flow or the second pilot flow, wherein:

an operation of the pump is controlled such that the pump supplies the hydraulic fluid at a pump supply pressure determined as a function of a highest load pressure of the system, wherein an operation of the pilot selector valve is configured to be controlled such that the pilot selector valve fluidly couples the pilot conduit to either the first pilot source conduit or the second pilot source conduit based on whether a load pressure associated with the hydraulic load corresponds to the highest load pressure of the system; and when the load pressure associated with the hydraulic load corresponds to the highest load pressure, the pilot selector valve is configured to fluidly couple the pilot conduit to the first pilot source conduit such that the pilot flow supplied to the pilot-operated compensator valve derives from the first pilot flow.

17. The system of claim 16, wherein a fluid pressure of the first pilot flow corresponds to the load pressure associated with the hydraulic load.

18. A method for controlling hydraulic fluid flow within a hydraulic system of a work vehicle, the method comprising:

operating a pump to supply hydraulic fluid at a pump supply pressure selected as a function of a highest load pressure of the hydraulic system, the hydraulic fluid being supplied to a hydraulic load via a fluid supply conduit, the hydraulic system comprising a flow control valve fluidly coupled to the fluid supply conduit upstream of the hydraulic load and a pilot-operated compensator valve fluidly coupled to the fluid supply conduit upstream of the flow control valve, the pilot-operated compensator valve being fluidly coupled to a pilot conduit such that the pilot conduit is configured to supply a pilot flow of the hydraulic fluid to the pilot-operated compensator valve;

determining, with a computing system, whether a load pressure associated with the hydraulic load corresponds to the highest load pressure of the hydraulic system; and controlling, with the computing system, an operation of a pilot selector valve to fluidly couple the pilot conduit to either a first pilot source conduit or a second pilot source conduit based on the determination of whether the hydraulic load corresponds to the highest load pressure, wherein controlling the operation of the pilot selector valve comprises controlling the operation of the pilot selector valve to fluidly couple the pilot conduit to the second pilot source conduit when the load pressure associated with the hydraulic load is less than the highest load pressure.

19. The method of claim 18, wherein a fluid pressure of the hydraulic fluid supplied through the second pilot source conduit corresponds to the pump supply pressure.

20. The method of claim 18, wherein a pressure of the pilot flow supplied to the pilot-operated compensator valve is greater than the load pressure associated with the hydraulic load.

21. The method of claim 18, wherein a pressure of the pilot flow supplied to the pilot-operated compensator pilot results in a reduction in a pressure drop across the pilot-operated compensator valve, the method further comprising controlling an operation of the flow control valve such that a pressure drop across the flow control valve is increased to accommodate at least a portion of the reduction in the pressure drop across the pilot-operated compensator valve.

22. A method for controlling hydraulic fluid flow within a hydraulic system of a work vehicle, the method comprising:

operating a pump to supply hydraulic fluid at a pump supply pressure selected as a function of a highest load pressure of the hydraulic system, the hydraulic fluid being supplied to a hydraulic load via a fluid supply conduit, the hydraulic system comprising a flow control valve fluidly coupled to the fluid supply conduit upstream of the hydraulic load and a pilot-operated compensator valve fluidly coupled to the fluid supply conduit upstream of the flow control valve, the pilot-operated compensator valve being fluidly coupled to a pilot conduit such that the pilot conduit is configured to supply a pilot flow of the hydraulic fluid to the pilot-operated compensator valve;

determining, with a computing system, whether a load pressure associated with the hydraulic load corresponds to the highest load pressure of the hydraulic system; and controlling, with the computing system, an operation of a pilot selector valve to fluidly couple the pilot conduit to either a first pilot source conduit or a second pilot source conduit based on the determination of whether the hydraulic load corresponds to the highest load pressure, wherein controlling the operation of the pilot selector valve comprises controlling the operation of the pilot selector valve to fluidly couple the pilot conduit to the first pilot source conduit when the load pressure corresponds to the highest load pressure, wherein a fluid pressure of the hydraulic fluid supplied through the first pilot source conduit corresponds to the load pressure.

* * * * *